(12) United States Patent
Kim

(10) Patent No.: US 7,991,442 B2
(45) Date of Patent: Aug. 2, 2011

(54) MULTIPLE OPENING AND CLOSING TYPE MOBILE COMMUNICATION TERMINAL

(75) Inventor: Sang-Jo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 768 days.

(21) Appl. No.: 11/322,271

(22) Filed: Dec. 29, 2005

(65) Prior Publication Data

US 2006/0148544 A1 Jul. 6, 2006

(30) Foreign Application Priority Data

Jan. 3, 2005 (KR) .................... 10-2005-0000259

(51) Int. Cl.
H04M 1/00 (2006.01)
(52) U.S. Cl. ............... 455/575.4; 455/575.3; 455/575.1
(58) Field of Classification Search ............... 455/575.4, 455/575.1, 575.3; 379/433.12, 433.13; D14/138 AB, 138 AD; 361/379.01, 679.02, 679.04
See application file for complete search history.

(56) References Cited

U.S. PATENT DOCUMENTS

| | | | | |
|---|---|---|---|---|
| 6,149,442 A * | 11/2000 | Enright | ............................ | 439/31 |
| 6,397,078 B1 * | 5/2002 | Kim | ............................ | 455/556.2 |
| 6,532,146 B1 * | 3/2003 | Duquette | ............................ | 361/679.04 |
| 6,667,877 B2 * | 12/2003 | Duquette | ............................ | 361/679.04 |
| 6,766,181 B1 * | 7/2004 | Newman et al. | ............................ | 455/575.3 |
| D520,976 S * | 5/2006 | LaDelfa | ............................ | D14/138 AB |
| 7,136,282 B1 * | 11/2006 | Rebeske | ............................ | 361/679.55 |
| 7,158,817 B2 * | 1/2007 | Kubo | ............................ | 455/575.3 |
| D565,532 S * | 4/2008 | Arnold | ............................ | D14/138 AD |
| 7,356,361 B1 * | 4/2008 | Hawkins et al. | ............................ | 455/575.1 |
| 7,373,185 B2 * | 5/2008 | Miyashita | ............................ | 455/575.3 |
| 2001/0009847 A1 * | 7/2001 | Kim et al. | ............................ | 455/90 |
| 2002/0077161 A1 * | 6/2002 | Eromaki | ............................ | 455/575 |
| 2005/0043056 A1 * | 2/2005 | Boesen | ............................ | 455/550.1 |
| 2005/0070348 A1 * | 3/2005 | Lee et al. | ............................ | 455/575.4 |
| 2005/0113154 A1 * | 5/2005 | Park et al. | ............................ | 455/575.4 |
| 2005/0114825 A1 * | 5/2005 | Leung et al. | ............................ | 717/100 |
| 2005/0248501 A1 * | 11/2005 | Kim | ............................ | 345/1.1 |
| 2005/0255897 A1 * | 11/2005 | Lee et al. | ............................ | 455/575.4 |
| 2005/0266897 A1 * | 12/2005 | Ahn et al. | ............................ | 455/575.1 |
| 2005/0270730 A1 * | 12/2005 | Klushin et al. | ............................ | 361/681 |
| 2006/0046792 A1 * | 3/2006 | Hassemer et al. | ............................ | 455/575.1 |
| 2006/0082518 A1 * | 4/2006 | Ram | ............................ | 345/1.1 |
| 2007/0103382 A1 * | 5/2007 | Chang et al. | ............................ | 345/1.1 |
| 2007/0127196 A1 * | 6/2007 | King, Jr. | ............................ | 361/681 |

* cited by examiner

Primary Examiner — Rafael Pérez-Gutiérrez
Assistant Examiner — Allahyar Kasraian
(74) Attorney, Agent, or Firm — Lee, Hong, Degerman, Kang & Waimey

(57) ABSTRACT

Disclosed herein is a multiple opening and closing type mobile communication terminal that is capable of operating in multiple opening and closing modes, i.e., in a folder-type opening and closing mode and in a slide-type opening and closing mode, thereby solving restrictions of installation spaces where an image display unit and a data input unit of the mobile communication terminal are installed, and including a larger-sized image display unit and a qwerty type keyboard, which is provided for personal computers, thereby improving the convenience of image display and information input. The mobile communication terminal includes a body part having a plurality of chips, a folder part hingedly coupled to the body part, and a slide part coupled to the folder part such that the slide part is moved relative to the folder part in a sliding manner, and therefore, the multiple opening and closing type mobile communication terminal is opened or closed.

12 Claims, 6 Drawing Sheets

MULTIPLE OPENING AND CLOSING TYPE MOBILE COMMUNICATION TERMINAL

Pursuant to 35 U.S.C. §119(a), this application claims the benefit of earlier filing date and right of priority to Korean Patent Application No(s). 10-2005-0000259 filed on Jan. 3, 2005, which is hereby incorporated by reference herein in their entirety.

FIELD OF THE INVENTION

The present invention relates to a mobile communication terminal, and, more particularly, to a multiple opening and closing type mobile communication terminal that is capable of operating in multiple opening and closing modes, i.e., in a folder-type opening and closing mode and in a slide-type opening and closing mode, thereby solving restrictions of installation spaces where an image display unit and a data input unit of the mobile communication terminal are installed, and including a larger-sized image display unit and a qwerty type keyboard, which is normally provided for personal computers, thereby improving the convenience of image display and information input.

DESCRIPTION OF THE RELATED ART

Generally, a mobile communication terminal is a portable wireless communication device that is capable of allowing a user of the mobile communication terminal to vocally communicate with a designated person having another mobile communication terminal.

The mobile communication terminal transmits a call message including a telephone number of a designated mobile communication terminal through a call channel of a base station, and, if the designated mobile communication terminal of a receiver responds to the mobile communication terminal of a transmitter, to enable voice communication between the transmitter and the receiver.

With the recent rapid progress of electronic communication industries, however, the newest functions, such as a game function, a video on demand (VOD) function, an electronic dictionary function, an MP3 player function, a still picture and motion picture recording function, and a television watching function, have been added to the mobile communication terminal in addition to a main function, i.e., a voice communication function, of the conventional mobile communication terminal.

The conventional mobile communication terminal includes an image display unit, such as a liquid crystal display (LCD) module, for displaying image information necessary for a user to recognize the state of the mobile communication terminal with the naked eye and to use the newest functions.

The conventional mobile communication terminal also includes a data input unit, such as a keypad or a touch screen, for the user to input various kinds of data, which are necessary to use the above-mentioned newest functions. The image display unit and the data input unit are disposed in various manners based on the appearance of the conventional mobile communication terminal.

Specifically, based on the appearance of the mobile communication terminal, the conventional mobile communication terminal is classified as a bar type mobile communication terminal, a folder type mobile communication terminal, and a slide type mobile communication terminal. The above-mentioned various kinds of conventional mobile communication terminals and the disposition of the image display unit and the data input unit based on the kinds of conventional mobile communication terminals will be described below in detail with reference to FIGS. 1 and 3.

FIGS. 1 to 3 illustrate conventional mobile communication terminals. FIG. 1 is a perspective view illustrating the appearance of a conventional bar type mobile communication terminal 100, FIG. 2 is a perspective view illustrating the appearance of a conventional folder type mobile communication terminal 140, and FIG. 3 is a perspective view illustrating the appearance of a conventional slide type mobile communication terminal 110.

The bar type mobile communication terminal 100 shown in FIG. 1 is an initially developed mobile communication terminal.

As shown in FIG. 1, the bar type mobile communication terminal 100 includes an image display unit 101 and a key input unit 102 disposed on the front surface thereof such that the image display unit 101 and the key input unit 102 are exposed.

The folder type mobile communication terminal 140 shown in FIG. 2 is one which has been developed after the bar type mobile communication terminal 100 shown in FIG. 1.

As shown in FIG. 2, the folder type mobile communication terminal 140 includes a folder part 160 having image display units, such as a main liquid crystal display (Main-LCD) module 161 and a subsidiary liquid crystal display (Sub-LCD) module (not shown), and a body part 150 having a keypad unit 151, which includes a dialing key and various function keys. The folder part 160 and the body part 150 are coupled with each other by a hinge coupling unit 170, thereby forming the appearance of the folder type mobile communication terminal 140.

Specifically, the keypad unit 151 is disposed at the front surface of the body part 150 of the folder type mobile communication terminal 140 for a user to input various kinds of data information, and one of the image display units, i.e., the main liquid crystal display (Main-LCD) module 161, is disposed at the front surface of the folder part 160 for displaying predetermined visual information.

The body part 150 and the folder part 160 are coupled with each other by the hinge coupling unit 170, which couples the body part 150 and the folder part 160 in a hinged fashion. The folder part 160 is constructed such that the folder part 160 can be hingedly rotated relative to the body part 150. Therefore, the keypad unit 151 and the main liquid crystal display (Main-LCD) module 161 are not exposed when the folder type mobile communication terminal 140 is in a closed state.

The slide type mobile communication terminal 110 shown in FIG. 3 is one which has been developed after the bar type mobile communication terminal 100 shown in FIG. 1 and the folder type mobile communication terminal 140 shown in FIG. 2.

As shown in FIG. 3, the slide type mobile communication terminal 110 includes a slide part 130 having an image display unit, such as a liquid crystal display (LCD) module 131, and a body part 120 having a keypad 121 and basic operational function units of the mobile communication terminal.

The slide type mobile communication terminal 110 with the above-stated construction further includes a slide module (not shown) for coupling the body part 120 and the slide part 130 such that the slide part 130 can be moved relative to the body part 120 in a sliding manner, and therefore, the slide type mobile communication terminal 110 can be opened or closed.

The image display unit and the data input unit may be disposed in various manners for the bar type mobile communication terminal, the folder type mobile communication terminal, and the slide type mobile communication terminal. However, recently developed mobile communication terminals are being combined with various personal information devices with the result that installation spaces where the image display unit and the data input unit are installed are not sufficient in the existing basic structures of the bar type mobile communication terminal, the folder type mobile communication terminal, and the slide type mobile communication terminal.

Also, the data input unit and the image display unit may be disposed in various manners based on the forms of the above-mentioned various mobile communication terminals. However, the data input unit and the image display unit must have sufficient sizes necessary to realize the newest functions provided by the respective mobile communication terminals. As a result, the size of the above-mentioned various mobile communication terminals has increased.

When it is necessary to provide the data input unit and the image display unit to the mobile communication terminal the size of which is restricted, the size of the data input unit and the image display unit is restricted. Consequently, the newest functions provided to the mobile communication terminal cannot be properly carried out.

Furthermore, the data input unit is disposed at the restricted area of the mobile communication terminal. In this case, various kinds of data are input using the combination of a small number of keys. Consequently, the user must sufficiently learn how to use the combination of keys necessary to input data when the mobile communication terminal is used.

SUMMARY OF THE INVENTION

Therefore, the present invention has been made in view of the above problems, and it is an object of the present invention to provide a multiple opening and closing type mobile communication terminal that is capable of operating in multiple opening and closing modes, i.e., in a folder-type opening and closing mode and in a slide-type opening and closing mode, thereby solving restrictions of an installation space where an image display unit of the mobile communication terminal is installed, and including a larger-sized image display unit, thereby improving the convenience of image display.

It is another object of the present invention to provide a multiple opening and closing type mobile communication terminal that is capable of operating in multiple opening and closing modes, i.e., in a folder-type opening and closing mode and in a slide-type opening and closing mode, thereby solving restrictions of an installation space where a data input unit of the mobile communication terminal is installed, and including a qwerty type keyboard, which is normally provided for personal computers, thereby improving the convenience of information input.

In accordance with the present invention, the above and other objects can be accomplished by the provision of a multiple opening and closing type mobile communication terminal comprising: a body part having a plurality of chips; a folder part hingedly coupled to the body part; and a slide part coupled to the folder part such that the slide part can be moved relative to the folder part in a sliding manner, and therefore, the multiple opening and closing type mobile communication terminal can be opened or closed.

According to the present invention, the multiple opening and closing type mobile communication terminal operates in multiple opening and closing modes, i.e., in a folder-type opening and closing mode and in a slide-type opening and closing mode, and therefore, the present invention has the effect of solving restrictions of an installation space where the image display unit of the mobile communication terminal is installed. Also, the multiple opening and closing type mobile communication terminal includes the larger-sized image display unit, and therefore, the present invention has the effect of improving the convenience of image display.

Furthermore, the multiple opening and closing type mobile communication terminal operates in multiple opening and closing modes, i.e., in a folder-type opening and closing mode and in a slide-type opening and closing mode, and therefore, the present invention has the effect of solving restrictions of an installation space where the data input unit of the mobile communication terminal is installed. Also, the multiple opening and closing type mobile communication terminal includes the qwerty type keyboard, which is normally provided for personal computers, and therefore, the present invention has the effect of improving the convenience of information input.

BRIEF DESCRIPTION OF THE DRAWINGS

The above and other objects, features and other advantages of the present invention will be more clearly understood from the following detailed description taken in conjunction with the accompanying drawings, in which:

FIGS. 1 to 3 illustrate conventional mobile communication terminals, wherein

FIG. 1 is a perspective view illustrating the appearance of a conventional bar type mobile communication terminal, FIG. 2 is a perspective view illustrating the appearance of a conventional folder type mobile communication terminal, and FIG. 3 is a perspective view illustrating the appearance of a conventional slide type mobile communication terminal; and FIGS. 4 to 9 illustrate a multiple opening and closing type mobile communication terminal according to a preferred embodiment of the present invention, wherein FIG. 4 is a perspective view illustrating the appearance of the mobile communication terminal according to the preferred embodiment of the present invention when the mobile communication terminal is closed, FIG. 5 is a perspective view illustrating the state of the mobile communication terminal according to the preferred embodiment of the present invention when a slide part of the mobile communication terminal is moved in a sliding manner, and therefore, the mobile communication terminal is opened, FIG. 6 is a perspective view illustrating the state of the mobile communication terminal according to the preferred embodiment of the present invention when a folder part of the mobile communication terminal is hingedly rotated, and therefore, the mobile communication terminal is opened, FIG. 7 is a perspective view illustrating the state of the mobile communication terminal according to the preferred embodiment of the present invention when the slide part of the mobile communication terminal is moved in a sliding manner, and at the same time, the folder part of the mobile communication terminal is hingedly rotated, and therefore, the mobile communication terminal is opened, FIG. 8 is a side view illustrating a locking unit according to a first preferred embodiment of the present invention, and FIG. 9 is a side view illustrating a locking unit according to a second preferred embodiment of the present invention.

DESCRIPTION OF THE PREFERRED EMBODIMENTS

Now, a mobile communication terminal according to a preferred embodiment of the present invention will be described in detail with reference to the accompanying drawings.

Figure 4:
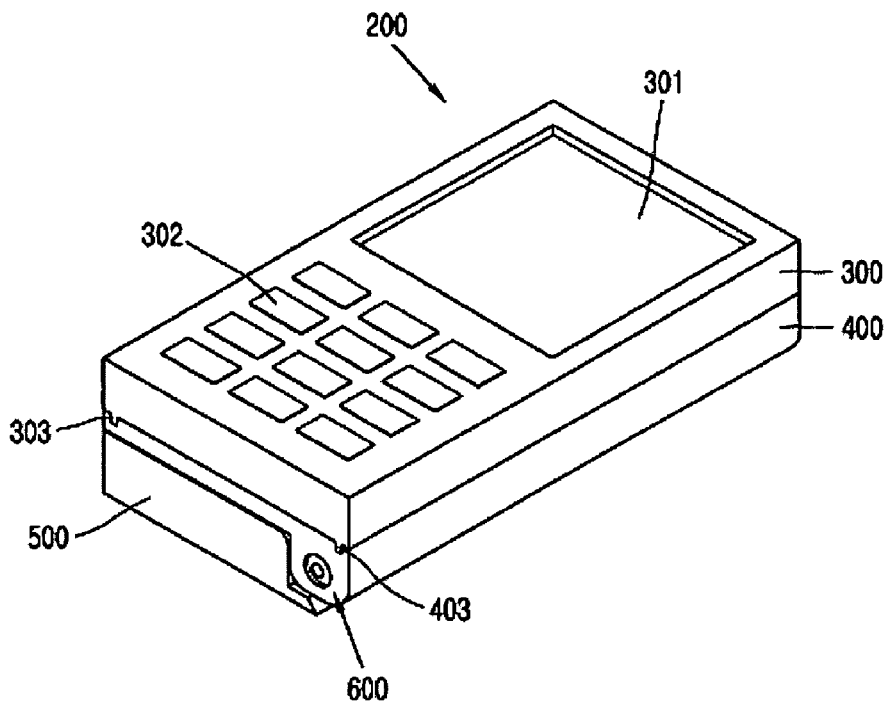

FIGS. 4 to 9 illustrate a multiple opening and closing type mobile communication terminal 200 according to a preferred embodiment of the present invention, and FIG. 4 is a perspective view illustrating the appearance of the mobile communication terminal 200 according to the preferred embodiment of the present invention when the mobile communication terminal 200 is closed.

As shown in FIG. 4, the multiple opening and closing type mobile communication terminal 200 according to the preferred embodiment of the present invention includes a body part 500 having a plurality of chips (not shown), a folder part 400 hingedly coupled to the body part 500, and a slide part 300 coupled to the folder part 400 such that the slide part 300 can be moved relative to the folder part 400 in a sliding manner, and therefore, the multiple opening and closing type mobile communication terminal 200 can be opened or closed.

The body part 500 and the folder part 400 of the multiple opening and closing type mobile communication terminal 200 are hingedly coupled with each other, and the folder part 400 is hingedly rotated relative to the body part 500, whereby the multiple opening and closing type mobile communication terminal 200 according to the preferred embodiment of the present invention is opened or closed.

The folder part 400 is provided with a slide module (not shown) for coupling the folder part 400 and the slide part 300 such that the slide part 300 can be moved relative to the folder part 400 in a sliding manner, and therefore, the multiple opening and closing type mobile communication terminal 200 can be opened or closed.

The sliding movement of the slide part 300 in the longitudinal direction of the folder part 400 will be described below with reference to FIG. 5.

Figure 5:
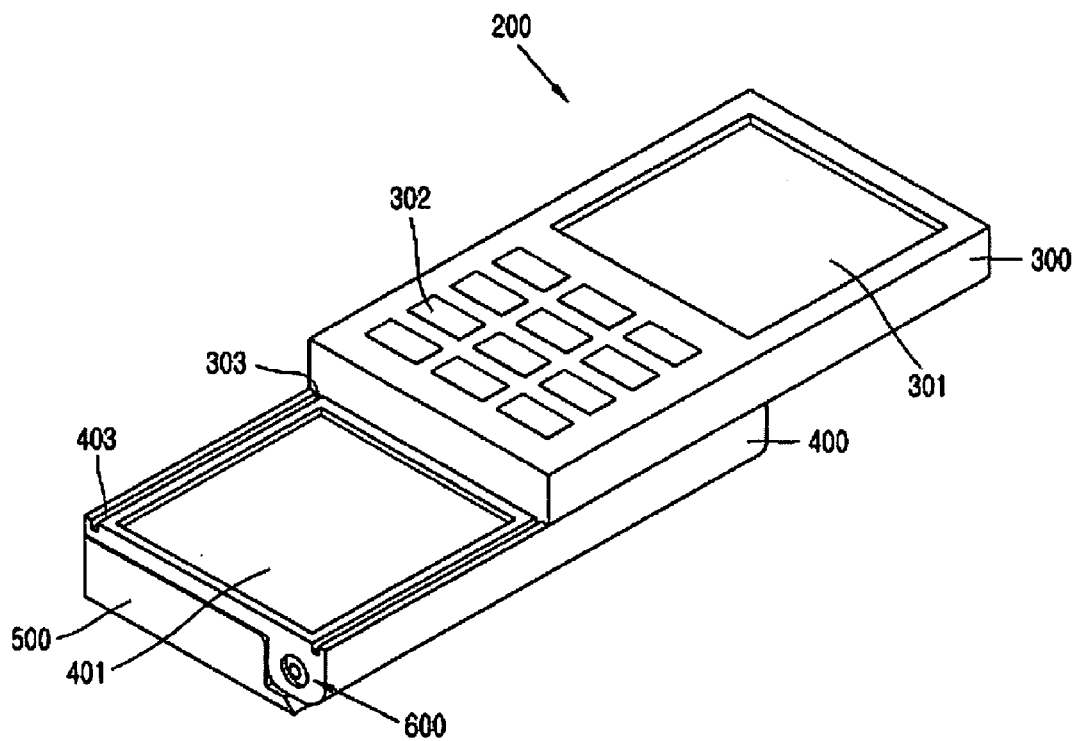

FIG. 5 is a perspective view illustrating the state of the mobile communication terminal 200 according to the preferred embodiment of the present invention when the slide part of the mobile communication terminal is moved in a sliding manner, and therefore, the mobile communication terminal is opened.

In the multiple opening and closing type mobile communication terminal 200 according to the preferred embodiment of the present invention shown in FIG. 5, the folder part 400 is hingedly coupled to the body part 500, which has the plurality of chips (not shown), and the slide part 300 is coupled to the folder part 400 by the slide module (not shown).

At the side edges of the folder part 400 disposed opposite to the slide part 300 are formed slide grooves 403, respectively, which extend in the longitudinal direction of the folder part 400 for guiding the slide part 300 when the slide part 300 is moved relative to the folder part 400 in a sliding manner. At the side edges of the slide part 400 disposed opposite to the folder part 400 are formed slide protrusions 303, which correspond to the slide grooves 403, respectively. The slide protrusions 303 extend in the longitudinal direction of the slide part 300. The slide protrusions 303 of the slide part 300 are engaged in the corresponding slide grooves 403 of the folder part 400 such that the slide protrusions 303 are guided along the slide grooves 403 when the slide part 300 is slid relative to the folder part 400.

Specifically, when the slide part 300 is slid relative to the folder part 400, the slide protrusions 303 engaged in the corresponding slide grooves 403 are guided along the corresponding slide grooves 403 while the slide part is slid by the slide module, and therefore, the sliding movement of the slide part 300 is properly guided.

At the front surface of the slide part 300 coupled to the folder part 400 of the multiple opening and closing type mobile communication terminal 200 according to the preferred embodiment of the present invention is disposed an image display unit 301 for displaying image. At the front surface of the folder part 400, which is exposed by the sliding movement of the slide part 300, is disposed a key input unit 401 for inputting data.

Although the image display unit 301 for displaying image is disposed at the front surface of the slide part 300, it is also possible that function keys 302 used to control various functions of the multiple opening and closing type mobile communication terminal 200 or other data input keys used to input various kinds of data are disposed in addition to the image display unit 301.

The folder part 400 coupled to the slide part 300 is hingedly rotated relative to the body part 500 such that the mobile communication terminal can be opened or closed. At the same time, the slide part 300 can be slid relative to the folder part 400 such that the mobile communication terminal can be opened or closed.

Now, the hinged-type rotation of the folder part 400 relative to the body part 500 to open or close the mobile communication terminal and the sliding movement of the slide part 300 relative to the folder part 400 to open or close the mobile communication terminal will be described in detail with reference to FIGS. 6 and 7.

Figure 6:
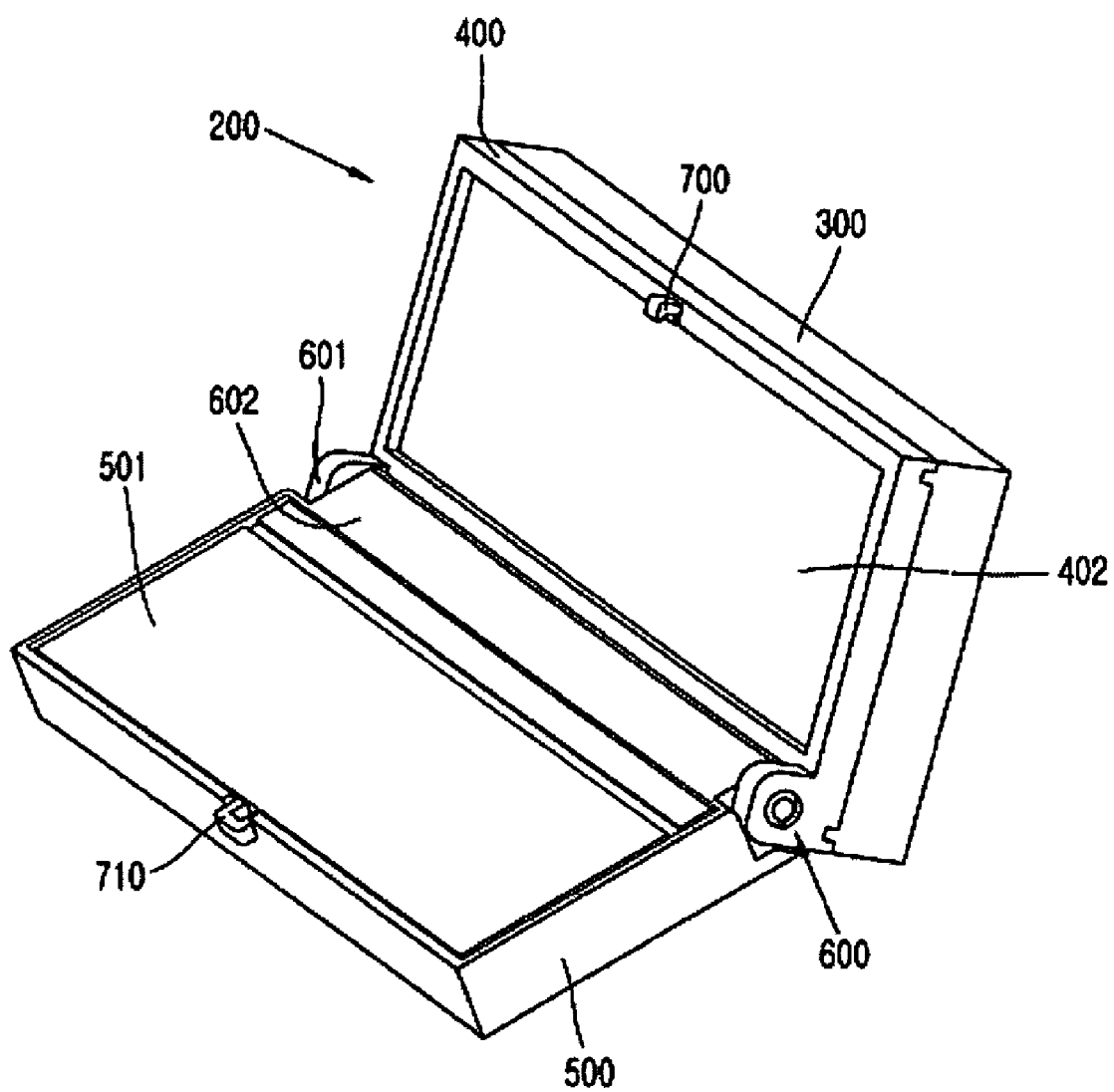
Figure 7:
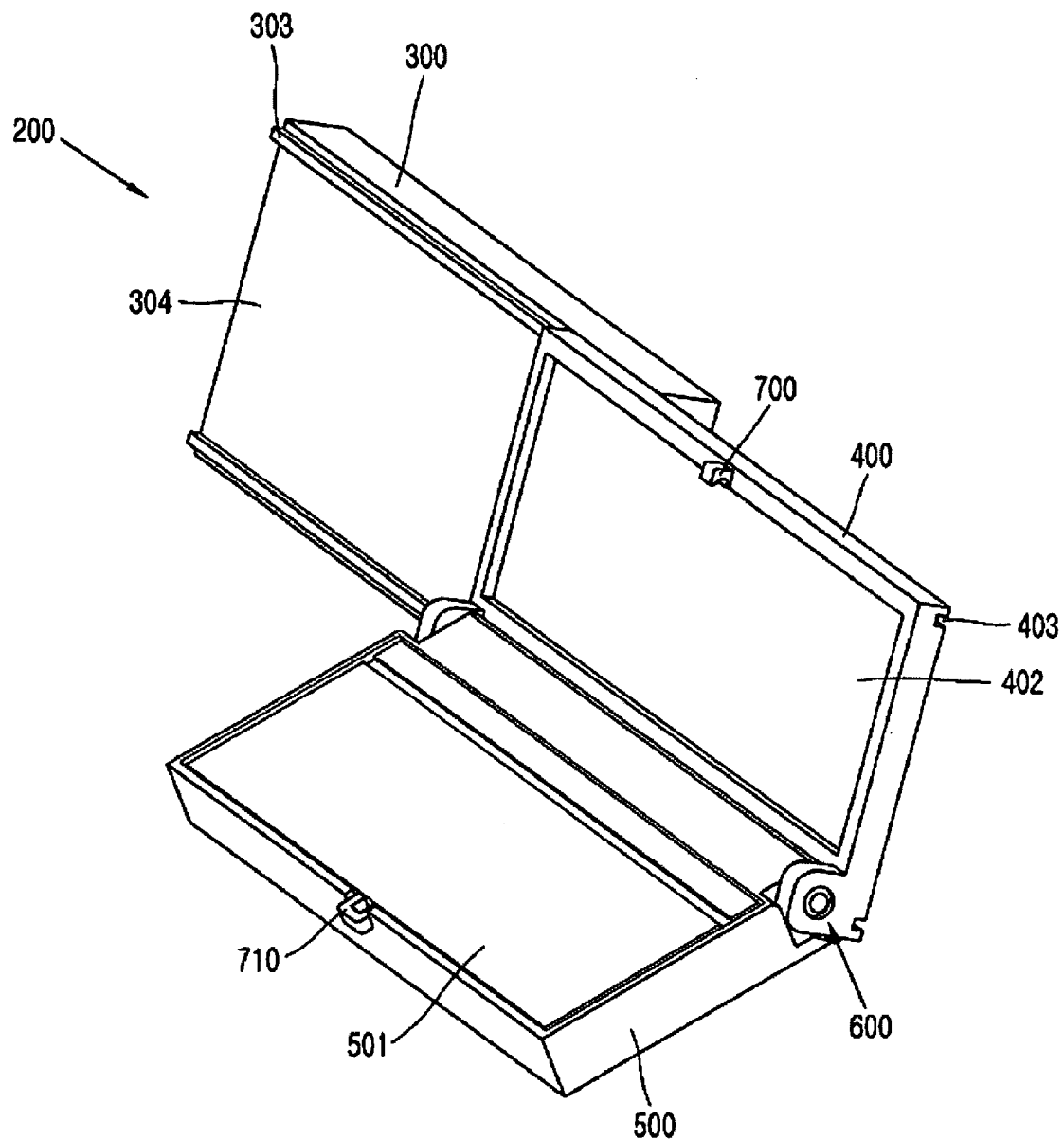

FIG. 6 is a perspective view illustrating the state of the mobile communication terminal according to the preferred embodiment of the present invention when the folder part of the mobile communication terminal is hingedly rotated, and therefore, the mobile communication terminal is opened, and FIG. 7 is a perspective view illustrating the state of the mobile communication terminal according to the preferred embodiment of the present invention when the slide part of the mobile communication terminal is slid, and at the same time, the folder part of the mobile communication terminal is hingedly rotated, and therefore, the mobile communication terminal is opened.

As shown in FIG. 6, the folder part 400, coupled to the slide part 300 by the slide module (not shown), is hingedly coupled to the body part 500. Consequently, the folder part 400 is hingedly rotated relative to the body part 500 together with the slide part 300, and therefore, the mobile communication terminal is opened.

Also, the slide part 300 coupled to the folder part 400, which is hingedly rotated relative to the body part 500, is moved relative to the folder part 400, and therefore, the mobile communication terminal is opened.

Figure 1:
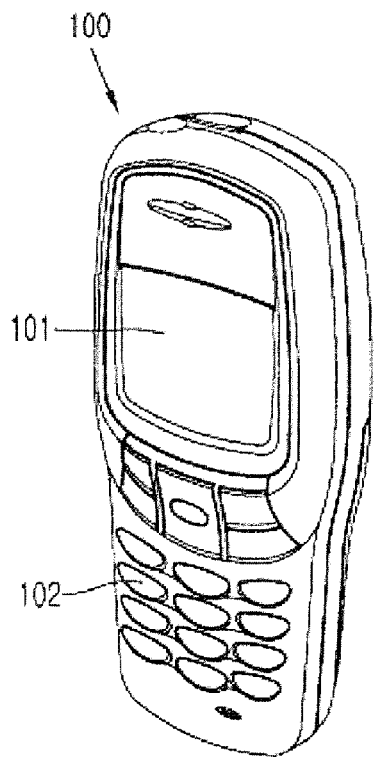
Figure 2:
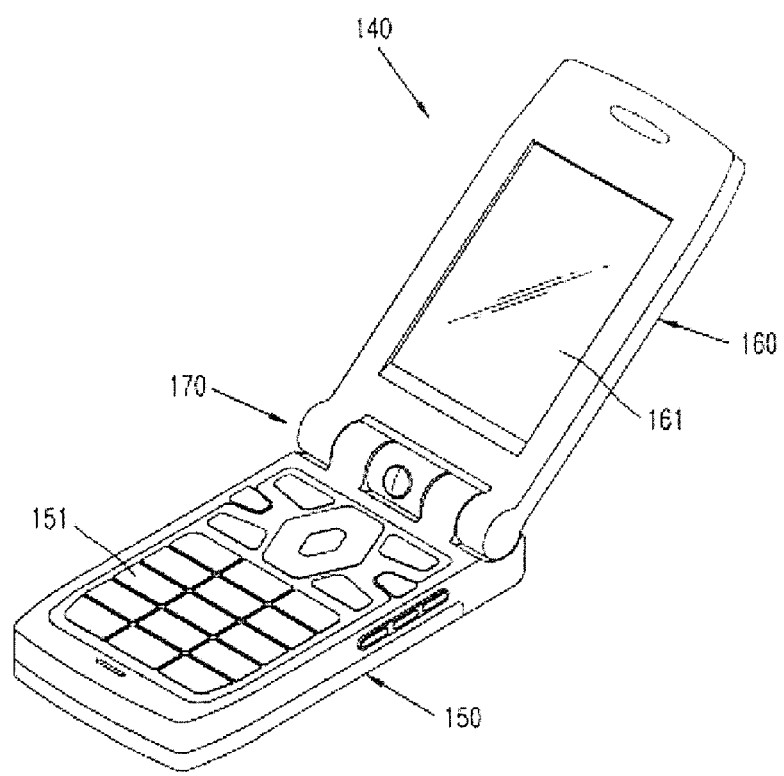
Figure 3:
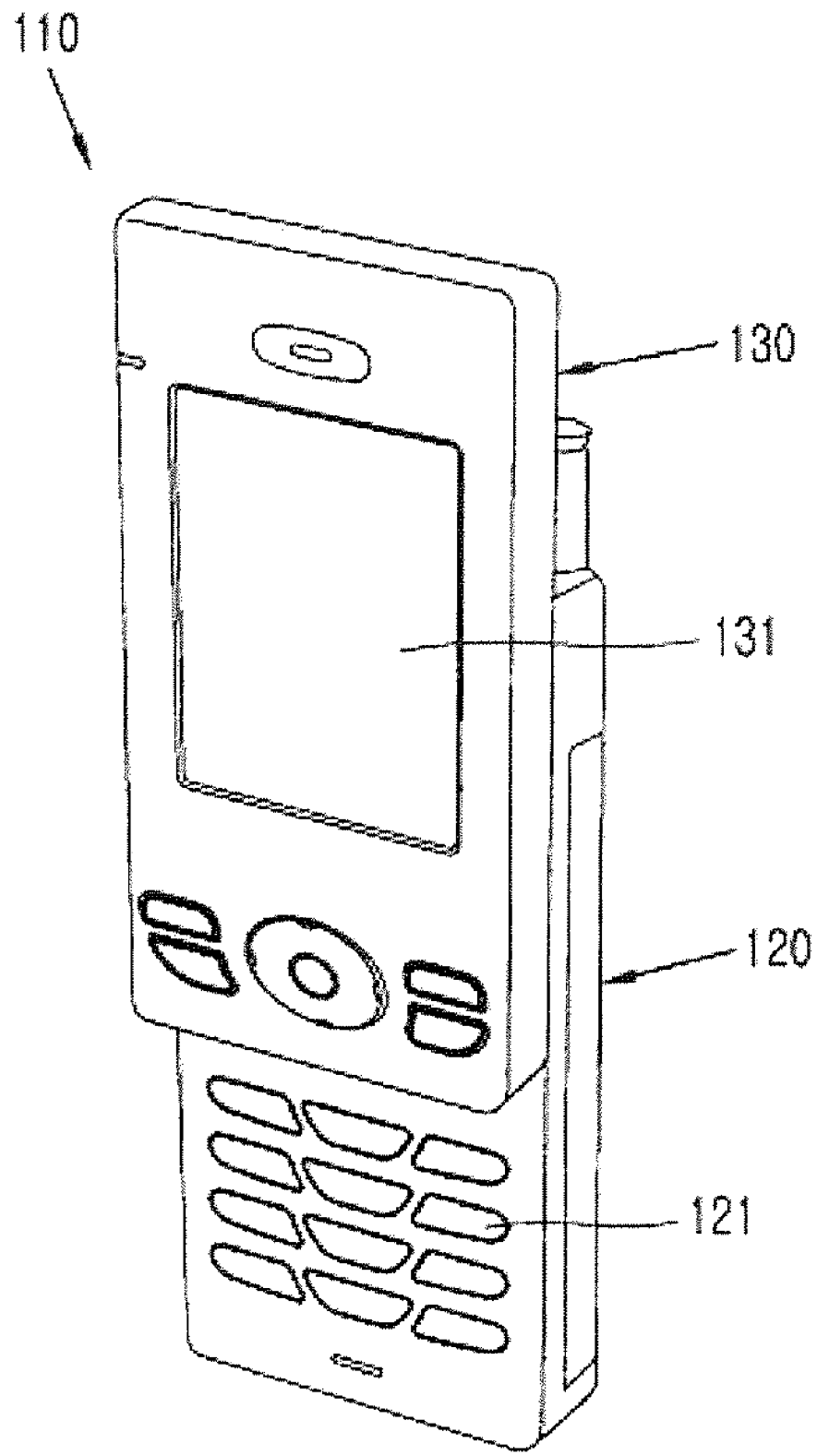

In this way, the multiple opening and closing type mobile communication terminal 200 according to the preferred embodiment of the present invention is opened or closed by the hinged-type rotation of the folder part 400 relative to the body part 500 and the sliding movement of the slide part 300 relative to the folder part 400. That is, the multiple opening and closing type mobile communication terminal 200 according to the preferred embodiment of the present invention operates in the multiple opening and closing modes including the folder-type opening and closing mode of the folder type mobile communication terminal 140 (see FIG. 2) and the slide-type opening and closing mode of the slide type mobile communication terminal 110 (see FIG. 3).

The slide part 300, the folder part 400, and the body part 500 of the multiple opening and closing type mobile communication terminal 200 according to the preferred embodiment of the present invention are provided with installation surfaces where image display units and data input units are disposed.

Specifically, a first installation surface 402 is formed at the rear surface of the folder part 400 such that the first installation surface 402 is opposite to the body part 500, a second installation surface 501 is formed at the front surface of the body part 500 such that the second installation surface 501 is opposite to the first installation surface 402, and a third installation surface 304 is formed at the rear surface of the slide part 300, which is exposed when the slide part 300 coupled to the folder part 400 is moved relative to the folder part 400 in a sliding manner.

At the first installation surface 402, the second installation surface 501, and the third installation surface 304 formed at the slide part 300, the folder part 400, and the body part 500 of the multiple opening and closing type mobile communication terminal 200 according to the preferred embodiment of the present invention may be disposed one of the image display unit used to display image and the key input unit used to input data.

The key input unit may be a touch screen. Alternatively, the key input unit may be a qwerty type keyboard, which is normally provided for personal computers. In this case, the convenience of data input is greatly improved when the mobile communication terminal is used.

At the body part 500 and the folder part 400 of the multiple opening and closing type mobile communication terminal 200 according to the preferred embodiment of the present invention are mounted a locking unit for locking the body part 500 and the folder part 400 to prevent the folder part 400 from being arbitrarily rotated relative to the body part in a hinged manner. The above-mentioned locking unit will be described below in detail with reference to FIGS. 8 and 9.

Figure 8:
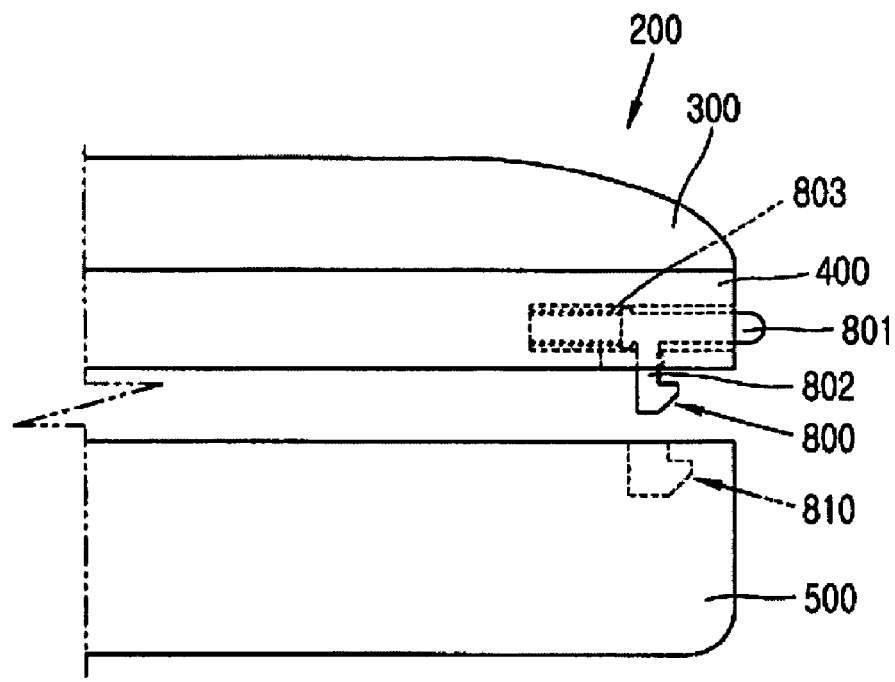

FIG. 8 is a side view illustrating a locking unit according to a first preferred embodiment of the present invention.

As shown in FIG. 8, the locking unit according to the first preferred embodiment of the present invention comprises a first locking unit disposed at the folder part 400 and a second locking unit disposed at the body part 500. The first locking unit includes a hook-shaped latch 802 disposed at the folder part 400, an elastic member, such as a spring 803, for providing an elastic force to the latch 802, and a switch 801 attached to the latch 802 for pushing the latch 802 to release the locked state of the folder part 400 such that the folder part 400 can be hingedly rotated relative to the body part. The second locking unit includes a latch groove 801 for allowing the latch 802 to be engaged therein such that the folder part 400 is locked to the body part 500.

In the locking unit with the above-stated construction according to the first preferred embodiment of the present invention, the latch 802 is engaged in the latch groove 810, and the latch 802 is fixed in the latch groove 803 by the elastic force of the spring 803. Consequently, when the slide part 300 is slid to use the multiple opening and closing type mobile communication terminal 200 according to the preferred embodiment of the present invention, the body part 500 and the folder part 400 are locked to each other by the locking unit, and therefore, the hinged-type rotation of the folder part 400 relative to the body part 500 is effectively prevented.

When a user pushes the switch 801 attached to the latch 802 to use the multiple opening and closing type mobile communication terminal 200, the latch 802 is disengaged from the latch groove 810, and therefore, the body part 500 and the folder part 400 are separated from each other. In this state, the folder part 400 is hingedly rotated relative to the body part 500 such that the multiple opening and closing type mobile communication terminal 200 according to the preferred embodiment of the present invention is opened, and therefore, the image display unit and the data input unit disposed at the body part 500 and the folder part 400 are used.

In the locking unit with the above-stated construction according to the first preferred embodiment of the present invention, the hook-shaped latch 802 is disposed at the body part 500, and the latch groove 810 is disposed at the folder part 400. However, it is also possible that the hook-shaped latch 802 is disposed at the folder part 400, and the latch groove 810 is disposed at the body part 500.

Figure 9:
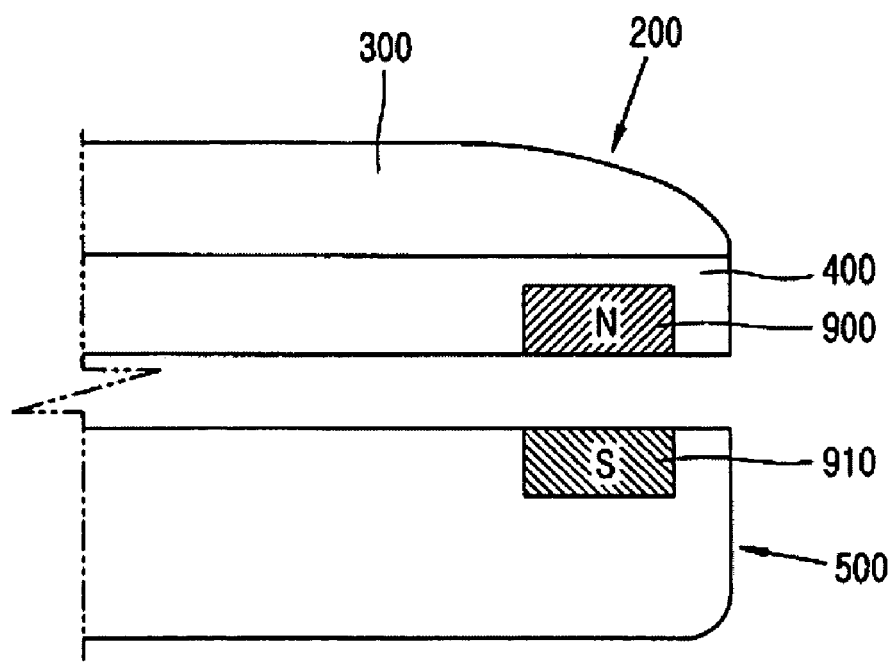

FIG. 9 is a side view illustrating a locking unit according to a second preferred embodiment of the present invention.

As shown in FIG. 9, the locking unit according to the second preferred embodiment of the present invention includes a first magnet 900, having a predetermined polarity, mounted at the body part 500 and a second magnet 910, having another polarity different from that of the first magnet 900, mounted at the folder part 400.

In the locking unit with the above-stated construction according to the second preferred embodiment of the present invention, the polarity of the first magnet 900 mounted at the folder part 400 is different from that of the second magnet 910 mounted at the body part 500, and therefore, the locking of the folder part 400 and the body part 500 is accomplished by the attraction of the first magnet 900 and the second magnet 910 therebetween.

When the user forcibly separates the first magnet 900 from the second magnet 910 to use the multiple opening and closing type mobile communication terminal 200, the folder part 400 is hingedly rotated relative to the body part 500 such that the multiple opening and closing type mobile communication terminal 200 according to the preferred embodiment of the present invention is opened, and therefore, the image display unit and the data input unit disposed at the body part 500 and the folder part 400 can be used.

In the locking unit with the above-stated construction according to the second preferred embodiment of the present invention, the first magnet 900 having the predetermined polarity is mounted at the folder part 400, and the second magnet 910 the polarity of which is different from that of the first magnet 900 is mounted at the body part 500. However, it is also possible that a magnet is mounted at the folder part 400, and a ferromagnetic body, which can be attracted to the magnet mounted at the folder part 400, is mounted at the body part 500.

Alternatively, the magnet may be mounted at the body part 500, and the ferromagnetic body, which can be attracted to the magnet mounted at the body part 500, may be mounted at the folder part 400.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As apparent from the above description, the multiple opening and closing type mobile communication terminal operates in multiple opening and closing modes, i.e., in a folder-type opening and closing mode and in a slide-type opening and closing mode, and therefore, the present invention has the effect of solving restrictions of an installation space where the image display unit of the mobile communication terminal is installed. Also, the multiple opening and closing type mobile communication terminal includes the larger-sized image display unit, and therefore, the present invention has the effect of improving the convenience of image display.

Furthermore, the multiple opening and closing type mobile communication terminal operates in multiple opening and closing modes, i.e., in a folder-type opening and closing mode and in a slide-type opening and closing mode, and therefore, the present invention has the effect of solving restrictions of an installation space where the data input unit of the mobile communication terminal is installed. Also, the multiple opening and closing type mobile communication terminal includes the qwerty type keyboard, which is normally provided for personal computers, and therefore, the present invention has the effect of improving the convenience of information input.

What is claimed is:

1. A multiple opening and closing type mobile communication terminal comprising:
    a body part including a plurality of chips, the body part comprising a first installation surface at a front surface of the body part;
    a folder part hingedly coupled to the body part, the folder part comprising a second installation surface at a rear surface of the folder part which is opposite to the first installation surface;
    at least one sliding groove formed on a front surface of the folder part, wherein the at least one sliding groove and the folder part are formed from a unitary piece;
    a slide part coupled to the front surface of the folder part via the at least one sliding groove, the slide part comprising a third installation surface at a rear surface of the slide part opposite the front surface of the folder part, such that the slide part can be moved along the at least one sliding groove relative to the folder part in a sliding manner, and further comprising a fourth installation surface at a front surface of the slide part;
    an image display unit for displaying an image disposed on the first installation surface, the second installation surface, the third installation surface, and the fourth installation surface; and
    a key input unit for inputting data disposed on the first installation surface, the second installation surface, and the third installation surface,
    wherein the third installation surface is exposed when the slide part is slid along the at least one sliding groove relative to the folder part,
    wherein the first installation surface, the second installation surface, the third installation surface, and the fourth installation surface are distinct surfaces, and
    wherein a hinge for hingedly coupling the folder part and the body part is parallel to the at least one sliding groove.

2. The mobile communication terminal as set forth in claim 1, wherein the folder part is hingedly coupled to the body part at one longitudinal side of the body part such that the folder part can be hingedly rotated relative to the body part in order to open and close the mobile communication terminal.

3. The mobile communication terminal as set forth in claim 1, wherein the slide part is slid in the longitudinal direction of the folder part such that the mobile communication terminal can be opened or closed.

4. The mobile communication terminal as set forth in claim 1, wherein the key input unit is a QWERTY type keyboard.

5. The mobile communication terminal as set forth in claim 1, further comprising:
    a locking unit mounted at the body part and the folder part for locking the body part and the folder part to prevent the folder part from being hingedly rotated relative to the body part, and preventing the mobile communication terminal from being opened.

6. The mobile communication terminal as set forth in claim 5, wherein the locking unit comprises:
    a hook-shaped latch disposed at one longitudinal side of the folder part; and
    a latch groove disposed at one longitudinal side of the body part hingedly coupled to the folder part such that the latch can be securely engaged in the latch groove.

7. The mobile communication terminal as set forth in claim 5, wherein the locking unit comprises:
    a hook-shaped latch disposed at one longitudinal side of the body part; and
    a latch groove disposed at one longitudinal side of the folder part hingedly coupled to the body part such that the latch can be securely engaged in the latch groove.

8. The mobile communication terminal as set forth in claim 5, wherein the locking unit comprises:
    a first magnet, having a predetermined polarity, mounted at the other longitudinal side of the folder part; and
    a second magnet, having another polarity different from that of the first magnet, mounted at the other longitudinal side of the body part such that the second magnet corresponds to the first magnet.

9. The mobile communication terminal as set forth in claim 5, wherein the locking unit comprises:
    a magnet, having a predetermined polarity, mounted at the other longitudinal side of one of the folder part and the body part; and
    a ferromagnetic body mounted at the other longitudinal side of the other of the folder part and the body part such that the ferromagnetic body corresponds to the magnet.

10. The mobile communication terminal as set forth in claim 1, wherein the key input unit is a touch screen.

11. The mobile communication terminal as set forth in claim 1, wherein the fourth installation surface comprises a keypad.

12. The mobile communication terminal as set forth in claim 1, wherein the front surface of the folder part comprises a touch screen input unit, and
    wherein the touch screen input unit is exposed when the slide part is moved along the at least one sliding groove relative to the folder part in a sliding manner.

* * * * *